(No Model.)
D. P. SHARP.
SPRING VEHICLE.
No. 276,906. Patented May 1, 1883.
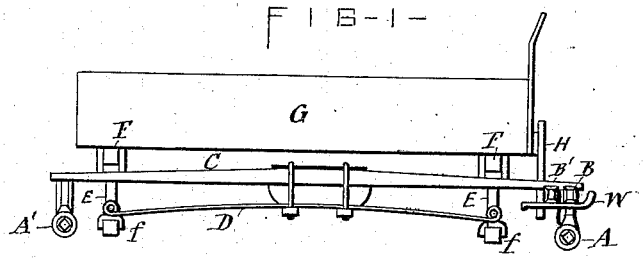
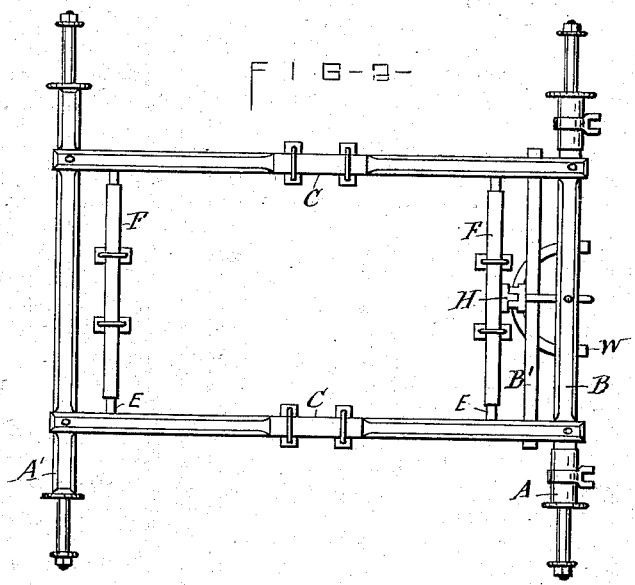
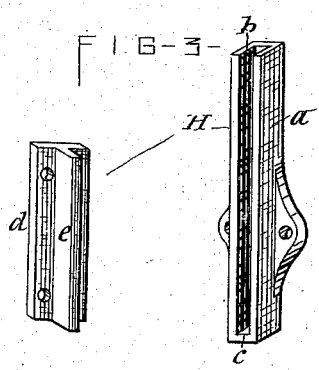
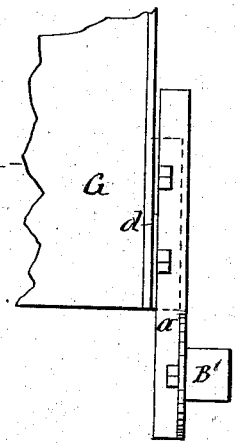
WITNESSES—
Wm. E. Raymond
J. H. Gibbs
INVENTOR—
Dennis P. Sharp

UNITED STATES PATENT OFFICE.

DENNIS P. SHARP, OF ITHACA, NEW YORK.

SPRING-VEHICLE.

SPECIFICATION forming part of Letters Patent No. 276,906, dated May 1, 1883.

Application filed February 10, 1883. (No model.)

*To all whom it may concern:*

Be it known that I, DENNIS P. SHARP, of Ithaca, in the county of Tompkins, in the State of New York, have invented new and useful Improvements in Spring-Vehicles, of which the following, taken in connection with the accompanying drawings, is a full, clear, and exact description.

This invention consists in the combination, with a spring-vehicle, of a guide connected, respectively, to a rigid part of the vehicle and to the body of the same, for the purpose of preventing lateral vibrations or swaying of the body, all constructed and arranged in the manner hereinafter more fully described, and specifically set forth in the claims.

Referring to the annexed drawings, Figure 1 is a side view of a vehicle provided with my improvements, and showing the same with the springs depressed to better illustrate the action thereof, and also the means for steadying the body of the vehicle. Fig. 2 is a plan view of the same with the body removed. Fig. 3 is an enlarged detached isometric view of the device for preventing the lateral vibrations of the vehicle-body, and Fig. 4 is a side view of the same with the parts in their operative positions.

Similar letters of reference indicate corresponding parts.

A and A' denote the two axles of a four-wheeled vehicle, and B B' are two cross-bars or head-blocks mounted on top of the fifth-wheel $w$ and arranged one back of the other.

C C represent two side bars, which rest with their extremities directly on top of the hind axle and on top of the two cross-bars B B' and firmly secured thereto, thus forming a rigid rectangular frame with said parts.

D D are two side springs, secured to the under side of the respective side bars, C C, in any well-known and suitable manner.

E E represent two semi-elliptic cross-springs, hung at their ends to the under side of the ends of the side springs by the couplings $f$, which allows the said springs the necessary play.

F F are bolsters mounted and secured on top of the cross-springs and supporting the body G, which is of such dimensions as to allow it to descend into the rectangular frame formed by the side bars, C C, front bars, B', and hind axle, A', as before described, said provision for the unimpeded play of the body being necessary, owing to the elasticity of the combined springs D E and their arrangement under the side bars and underneath one another, whereby the body is carried as low as possible in relation to the side bars.

The described arrangement of side springs and cross-springs can be applied to a sulky as well as to a four-wheeled vehicle by connecting the side springs to the under side of the thill, which serves the functions of the side bars hereinbefore described.

In order to guard against excessive lateral swaying or rocking of the body G, I employ a guide, H, in the form of two metal plates, $a$ and $d$, one of which is provided with a vertical groove, $b$, and the other plate, $d$, being provided with a tongue, $e$, adapted to slide in the groove $b$ aforesaid. One of these plates I attach either to the cross-bar B' on the hind axle, A', or to both on the side facing the end of the body, and the other plate I secure to the end of the body, in such a position as to bring the tongue $e$ into the groove $b$. By closing the end of the groove $b$ a stop, $c$, is formed, which, by its collision with the tongue $e$, serves to prevent the body G from dropping in case either of the springs or side bars should break.

If desired, a suitable anti-rattling lining may be introduced between the tongue $e$ and adjacent faces of the groove $b$.

Having described my invention, what I claim as new, and desire to secure by Letters Patent, is—

1. The combination, with a spring-wagon, of a guide consisting of tongue and grooved parts secured in a vertical position, respectively, on the head-block or hind axle and on the body of the vehicle, substantially as and for the purpose set forth.

2. The plate $a$, provided with the vertical groove $b$ and stop $c$, and the plate $d$, provided with the tongue $e$, in combination with the head-block or axle and body of a vehicle, substantially as described and shown, for the purpose set forth.

In testimony whereof I have hereunto signed my name and affixed my seal, in the presence of two attesting witnesses, at Ithaca, in the county of Tompkins, in the State of New York, this 2d day of February, 1883.

DENNIS P. SHARP. [L. S.]

Witnesses:
B. R. WILLIAMS,
P. J. PARTENHEIMER.